C. E. WALLIN.
Horse-Cover.
No. 227,328. Patented May 4, 1880.
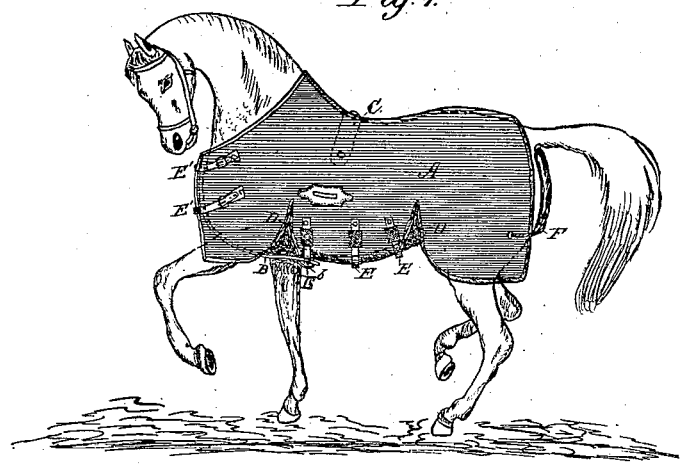
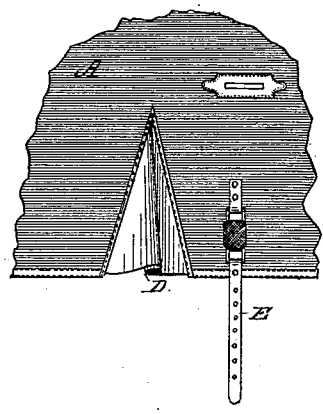
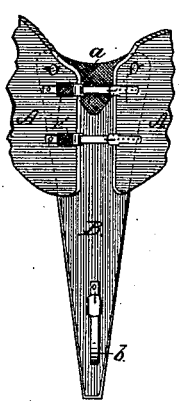
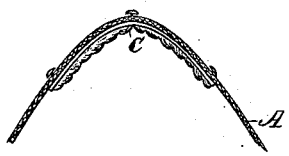
WITNESSES:
W. W. Hollingsworth
Amos W. Hart
INVENTOR:
Chas. E. Wallin
BY
ATTORNEYS.

UNITED STATES PATENT OFFICE.

CHARLES E. WALLIN, OF SALT LAKE CITY, UTAH TERRITORY.

HORSE-COVER.

SPECIFICATION forming part of Letters Patent No. 227,328, dated May 4, 1880.

Application filed February 28, 1880.

*To all whom it may concern:*

Be it known that I, CHARLES E. WALLIN, of Salt Lake City, in the county of Salt Lake, Utah Territory, have invented a new and Improved Horse-Cover; and I do hereby declare that the following is a full, clear, and exact description of the same.

The object of my invention is to provide a horse cover or blanket which shall afford greater protection than the ordinary blanket to the breast and other parts of the body, also be more comfortable to the animal by allowing greater freedom of movement, yet less liable to rip or tear or become displaced when the animal lies down or gets up. These results are attained by the provision of a detachable breast-piece, elastic straps, a pad, and gussets or gores attached to the body of the cover, and arranged as hereinafter described.

In accompanying drawings, forming part of this specification, Figure 1 is a side view representing the blanket applied to a horse. Fig. 2 is a front view, showing the form of the breast-piece and its attachment to the body of the blanket. Fig. 3 is a view of a portion of the side of the blanket. Fig. 4 is a cross section of a portion of the blanket, showing the arrangement of the pad.

The body or main portion of the cover A may be made of the usual or any other approved material. The novel parts or attachments thereof consist of the breast piece or protector B, the pad C, the gussets D, and elastic straps E E', &c., and tail-piece F.

The piece B, Fig. 2, is approximately triangular in form, and its broader end is buttoned to the front portion of the cover A, above the elastic breast-straps E', and provided with an elastic gore, *a*, while its smaller end has a loop, *b*, to receive the front belly-band, E. Said piece B protects the lungs of the animal from cold, and is so attached as to prevent the cover tearing from the point of the shoulders to the withers.

The pad C, which is constructed of cloth or soft leather and stuffed in the usual way, is attached to the cover A, on the inner side, at the point just in rear of the withers. The elastic belly-bands E secure the cover closely around the body of the animal, and the pad C is thereby pressed down on the ridge of the back, so that it will prevent the cover being turned easily. The pad and short belly-straps thus subserve the function of a surcingle.

The gussets D have the usual triangular form, and are inserted just in front of the first belly-band, E. These enable the cover to fit close to the body of the animal and yet allow the shoulders and front limbs freedom of movement.

The elastic breast and belly straps E' E and elastic tail-piece F relieve the cover of undue strain when the animal lies down or gets up.

The elastic gore *a* in the breast-protector B allows the latter to expand similarly to the breast-straps.

I do not claim, broadly, a horse-cover provided with a breast-protector or gussets; but

What I claim is—

1. The triangular breast-piece B, provided with the elastic gore *a* and attaching devices at its upper end, and with the loop *b* at its smaller end, whereby it is adapted for attachment to the body of a horse-cover, in the manner shown and described.

2. The horse-cover having the belly-band E and the gussets D inserted in its side edges between the shoulder-piece and belly-band, as shown and described, for the purpose specified.

3. An improved horse-cover, having a pad, C, attached to it on the inner side, and provided with a belly-strap, substantially as shown and described, for the purpose specified.

CHARLES E. WALLIN.

Witnesses:
JOHN A. GROESBECK,
GEORGE A. BLACK.